R. G. LEDIG.
ELECTRIC HEATER.
APPLICATION FILED OCT. 25, 1920.

1,391,960.

Patented Sept. 27, 1921.

INVENTOR:
Richard G. Ledig.
BY Diedersheim + Fairbanks
ATTORNEYS.

UNITED STATES PATENT OFFICE.

RICHARD G. LEDIG, OF PHILADELPHIA, PENNSYLVANIA, ASSIGNOR TO A. MECKY COMPANY, OF PHILADELPHIA, PENNSYLVANIA, A CORPORATION OF PENNSYLVANIA.

ELECTRIC HEATER.

1,391,960.  Specification of Letters Patent.  Patented Sept. 27, 1921.

Application filed October 25, 1920. Serial No. 419,172.

*To all whom it may concern:*

Be it known that I, RICHARD G. LEDIG, a citizen of the United States, residing in the city and county of Philadelphia, State of Pennsylvania, have invented a new and useful Electric Heater, of which the following is a specification.

My invention consists of an electric heater which embodies an electric heating unit, a reflector, and a casing containing and supporting the latter, said reflector being of disk-like nature, and having said unit in front of the same.

The invention is satisfactorily illustrated in the accompanying drawing, but the important instrumentalities thereof may be varied, and so it is to be understood that the invention is not limited to the specific details shown and described, as long as they are within the spirit or scope of the claims.

Similar numerals of reference indicate corresponding parts in the figures.

Figure 1:
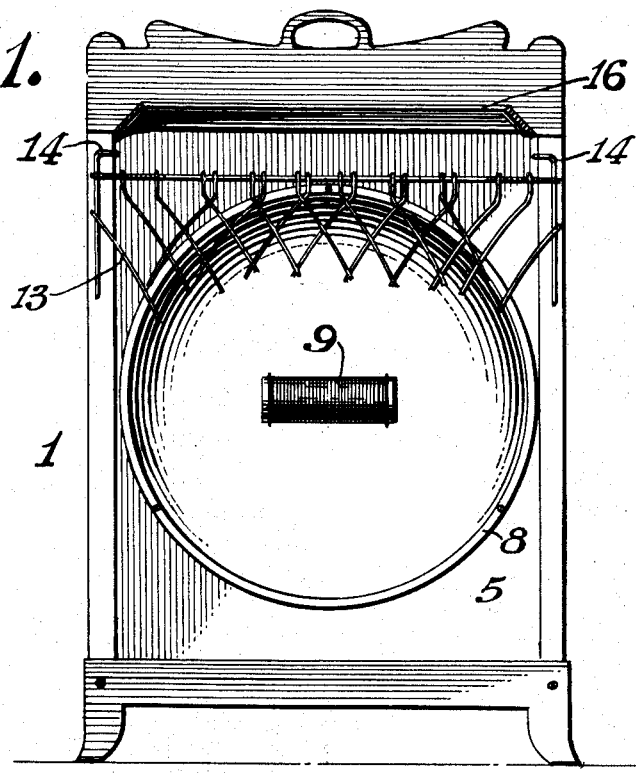
Figure 1 represents a front view of an electric heater embodying my invention, portion of the guard therefor being removed.
Figure 2:
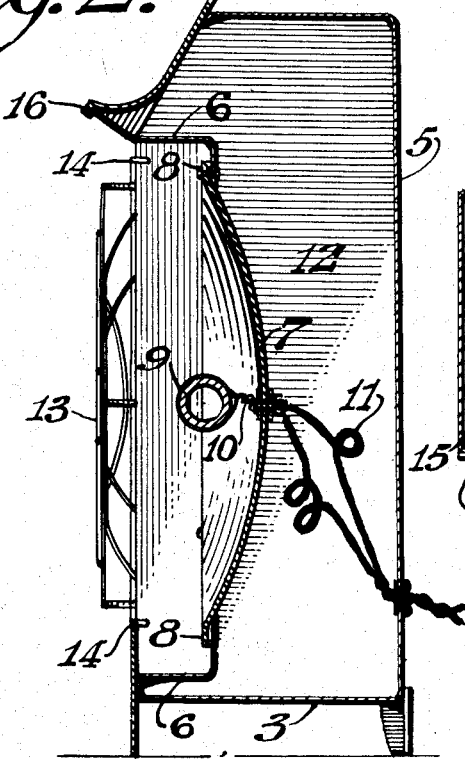
Fig. 2 represents a central vertical section thereof.
Figure 3:
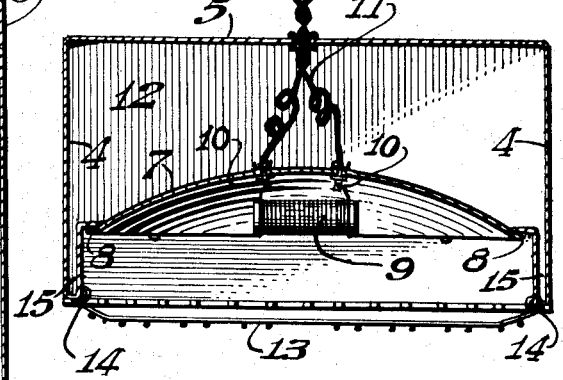
Fig. 3 represents a horizontal section thereof.

Referring to the drawings.

1 designates a casing formed of suitable metal and composed of the top wall 2, the bottom wall 3, the side walls 4 and the rear wall 5, said walls being closed, the front of the casing being open.

Within the casing is the partition 6 which is partially cut-away forming a recess in which is fitted the reflector member 7 whose peripheral portion of rim 8 is screwed or otherwise secured to the adjacent portion of the partition 6, thus sustaining the reflector within the casing, said partition closing the casing around said reflecting member.

The reflector is a disk preferably of copper, concave in front. At the center of the disk is placed the electric heating unit 9 the ends of whose wire are connected with the ears 10 which are screwed to the disk and are electrically engaged with the electric conductors 11 by suitable binding screws rearward of the disk, said conductors extending from a source of electric energy and so being adapted to energize the heater 9.

It will be noticed that while the front face of the reflector is concave its rear is convex and it enters the chamber 12 of the casing rearward of the reflector, consequently when the unit 9 is energized its heat while also heating the member 7 will be reflected forwardly and so out of the casing into the apartment in which the device is located, while some of the heat will be communicated by the rear face of the reflector into the chamber 12, thus heating the casing to that extent.

In front of the casing is the guard 13 of heavy wire or other suitable open work whose sides are provided with hooks 14 which may be sprung upon the forward portions of the sides of the casing, thus holding said guard in position.

At the top of the front of the casing is the deflector 16 for evident purposes.

The forward portions of the sides 4 of the casing are formed of double walls producing the chamber 15 which is in communication with the chamber 12 so as to receive heat from the latter and thus assist in heating said portions of the casing.

Having thus described my invention what I claim as new and desire to secure by Letters Patent, is:—

1. An electric heater consisting of a reflecting member, a heating unit, a casing open in front adapted to contain said unit and member, and means for electrically energizing said unit, said reflecting member embodying a disk having in front a reflecting surface, and said heating unit being sustained forward of said surface and said casing having therein a recessed partition in which the reflecting member is seated and with which it is connected.

2. An electric heater consisting of a reflecting member, a heating unit, a casing open in front adapted to contain said heating unit and reflecting member, means for electrically energizing said heating unit, said reflecting member embodying a disk having in front a reflecting surface, and said heating unit being sustained forward of said reflecting surface, and a recessed partition, said reflecting member being secured within the recess of said partition.

3. An electric heater comprising in combination, a casing open in front, a recessed partition within said casing, a reflecting member secured within the recess in said partition, ears secured to said reflecting member, and a heating element positioned entirely within said casing and partially within said reflecting member and secured to said reflecting member by the above mentioned ears.

4. An electric heater comprising in combination, a casing open in front, a recessed partition within said casing, a reflecting member positioned within said recess and connected to said partition, ears secured to said reflecting member, and a heating element positioned within said casing and partially within said reflecting member and secured to said reflecting member by the above mentioned ears.

RICHARD G. LEDIG.

Witnesses:
JOHN A. WIEDERSHEIM,
N. BUSSINGER.